US008718327B2

(12) United States Patent
Tong et al.

(10) Patent No.: US 8,718,327 B2
(45) Date of Patent: May 6, 2014

(54) GESTURE RECOGNITION USING DEPTH IMAGES

(75) Inventors: Xiaofeng Tong, Beijing (CN); Dayong Ding, Beijing (CN); Wenlong Li, Beijing (CN); Yimin Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/387,221

(22) PCT Filed: Apr. 11, 2011

(86) PCT No.: PCT/CN2011/072581
§ 371 (c)(1),
(2), (4) Date: Jan. 26, 2012

(87) PCT Pub. No.: WO2012/139268
PCT Pub. Date: Oct. 18, 2012

(65) Prior Publication Data
US 2014/0037134 A1    Feb. 6, 2014

(51) Int. Cl.
*G06K 9/00* (2006.01)
(52) U.S. Cl.
USPC .......................................... 382/103; 715/863
(58) Field of Classification Search
USPC ....................... 382/103, 154; 348/51; 715/863
See application file for complete search history.

(56) References Cited

U.S. PATENT DOCUMENTS

| 7,308,112 B2 * | 12/2007 | Fujimura et al. ............... 382/103 |
| 7,590,262 B2 * | 9/2009 | Fujimura et al. ............... 382/104 |
| 2005/0151850 A1 * | 7/2005 | Ahn et al. ................. 348/207.99 |
| 2005/0271279 A1 * | 12/2005 | Fujimura et al. ............... 382/203 |
| 2008/0212836 A1 * | 9/2008 | Fujimura et al. ............... 382/103 |
| 2011/0243529 A1 * | 10/2011 | Oryoji et al. .................. 386/248 |

FOREIGN PATENT DOCUMENTS

| CN | 101324954 A | 12/2008 |
| CN | 101388115 A | 3/2009 |
| CN | 101401124 A | 4/2009 |

OTHER PUBLICATIONS

International Search Report mailed Dec. 1, 2011, issued in International Application No. PCT/CN2011/072581 filed Apr. 11, 2011.

* cited by examiner

*Primary Examiner* — Samir Ahmed
(74) *Attorney, Agent, or Firm* — Schwabe, Williamson & Wyatt, P.C.

(57) ABSTRACT

Methods, apparatuses, and articles associated with gesture recognition using depth images are disclosed herein. In various embodiments, an apparatus may include a face detection engine configured to determine whether a face is present in one or more gray images of respective image frames generated by a depth camera, and a hand tracking engine configured to track a hand in one or more depth images generated by the depth camera. The apparatus may further include a feature extraction and gesture inference engine configured to extract features based on results of the tracking by the hand tracking engine, and infer a hand gesture based at least in part on the extracted features. Other embodiments may also be disclosed and claimed.

26 Claims, 6 Drawing Sheets

GESTURE RECOGNITION USING DEPTH IMAGES

This application is a national stage application of PCT application PCT/CN2011/072581, filed Apr. 11, 2011, entitled "GESTURE RECOGNITION USING DEPTH IMAGES," and claims priority to the PCT application.

TECHNICAL FIELD

Embodiments of the present disclosure relate to the field of data processing, in particular, to methods, apparatuses and articles associated with gesture recognition.

BACKGROUND

Unless otherwise indicated herein, the materials described in this section are not prior art to the claims in this application and are not admitted to be prior art by inclusion in this section.

With the fast growth of smart TV, smart phones, and tablets, there is an urgent desire to create innovative features/usage models to provide customers with better personalized service, social network and added value service (AVS) based on higher computing power, wider bandwidth and richer content. User interaction plays an important part in the user's experience. Among existing user-interface techniques, keyboard, mouse, trackball, and other point and click devices are typically employed. Gesture is a natural method of interaction and has been widely utilized in daily life in reality. Most existing gesture recognition systems utilize common webcameras, which depend on light, illumination, and other environment conditions. As a result, current gesture recognition systems are typically unstable or inefficient.

BRIEF DESCRIPTION OF THE DRAWING

Embodiments of the present disclosure will be presented by way of example embodiments, but not limitations, illustrated in the accompanying drawings in which like references denote similar elements, and in which.

DETAILED DESCRIPTION

Figure 1:
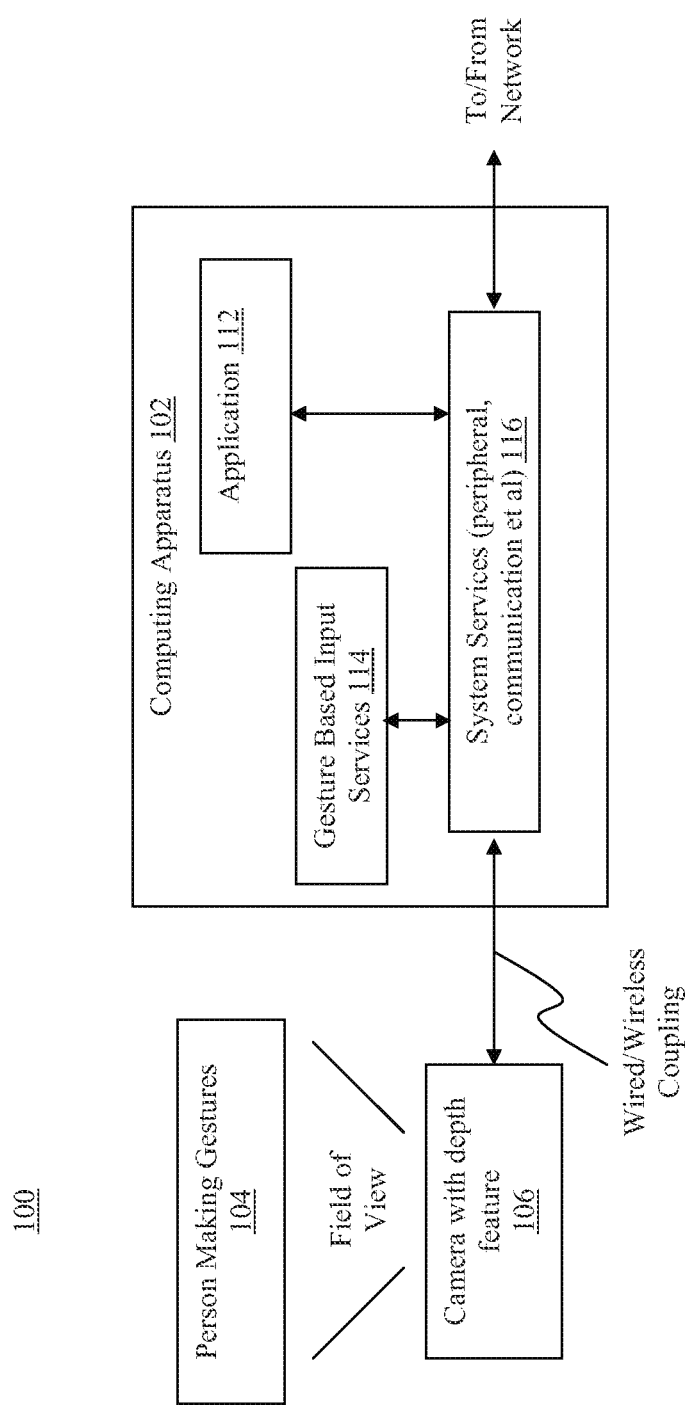
FIG. 1 illustrates an overview of a gesture recognition arrangement, in accordance with various embodiments of the present disclosure.

Methods, apparatuses, and articles associated with gesture recognition using depth images are disclosed herein. In various embodiments, an apparatus may include a face detection engine configured to determine whether a face is present in one or more gray images of respective image frames generated by a depth camera, and a hand tracking engine configured to track a hand in one or more depth images generated by the depth camera. The apparatus may further include a feature extraction and gesture inference engine configured to extract features based on results of the tracking by the hand tracking engine, and infer a hand gesture based at least in part on the extract features.

In various embodiments, the face detection engine may be configured to analyze the gray images, using e.g., a Haar-Cascade model, to determine whether a face is present in the one or more gray images. Further, either the face detection engine or the hand tracking engine may be configured to determine a measure of a distance between the face and the camera, using the one or more depth images.

In various embodiments, the hand tracking engine may be further configured to select respective regions of the depth images that are size-wise smaller than the one or more depth images, to detect and track the hand, based at least in part on the determined distance between the face and the camera. The hand tracking engine may be further configured to determine location measures of the hand. The hand tracking engine may be configured to determine the location measures in terms of a pair of (x, y) coordinates for a center of the hand for respective ones of the one or more depth images, using mean-shift filtering that uses gradients of probabilistic density.

In various embodiments, the feature extraction and gesture inferring engine may be configured to extract one or more of an eccentricity measure, a compactness measure, an orientation measure, a rectangularity measure, a horizontal center measure, a vertical center measure, a minimum bounding box angle measure, or a minimum bounding box width-to-height ratio measure, a difference between left-and-right measure, or a difference between up-and-down measure. Further, the feature extraction and gesture inferring engine may be configured to infer one of an open hand gesture, a closed hand fist gesture, a thumb up gesture, a thumb down gesture, a thumb left gesture or a thumb right gesture, based on the extracted features. Additionally, the feature extraction and gesture inference engine may be further configured to notify an application of the inferred hand gesture.

In various embodiments, the apparatus may further include the camera. The apparatus may be a selected one of a desktop computer, a laptop computer, a tablet computer, a server, a smart phone, a personal digital assistant, a game console, or a set-top box.

In various embodiments, a first method may include tracking, by a computing apparatus, a hand in selected respective regions of one or more depth images generated by a depth camera, wherein the selected respective regions are size-wise smaller than the respective one or more depth images. The first method may further include inferring a hand gesture, by the computing device, based at least in part on a result of the tracking.

In various embodiments, a second method may include extracting, by a computing apparatus, one or more features from respective regions of depth images of image frames generated by a depth camera. The second method may further include inferring a gesture, by the computing apparatus, based at least in part on the one or more features extracted from the depth images.

Various aspects of the illustrative embodiments will now be further described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. A feature described in a parenthetical format denotes the feature as an optional feature, e.g., "an instance of (partitions of) an application service," denotes the application service may or may not be "partitioned."

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

FIG. 1 illustrates an overview of a gesture recognition arrangement, in accordance with various embodiments of the present disclosure. As illustrated, for the embodiments, computing apparatus 102, incorporated with gesture based input service 114, may be coupled with camera 106 with depth feature, to enable person 104 to provide inputs to application 112 operating on apparatus 102, using gestures, in particular, hand gestures.

Computing apparatus 102, except for gesture based input service (hereinafter OBIS) 114, may be any one of a number of computing devices known in the art. Examples of such computing devices include, but are not limited to, desktop computers, laptop computers, tablet computers, smart phones, personal digital assistants, game console, and/or set-top boxes. Likewise, application 112, except for the fact it may receive gesture inputs, by virtue of the services provided by GBIS 114, may be any one of a number of applications that may benefit from gesture inputs; e.g., games, media players, video applications, and so forth. For the embodiments, in addition to application 112 and GBIS 114, apparatus 102 may further include system services 116 for providing a wide range of system services, including but not limited to, communication services for application 112 and GBIS 114, and peripheral services for camera 106. The coupling between computing apparatus 102 and camera 106 may be wired or wireless. For the embodiments, service services 116 may be further configured to support access to a network by computing apparatus 102. The network may be wired or wireless, local or wide area, private or public, including e.g., the Internet.

Camera 106 may be any depth camera known in the art configured to capture and output image frames, including determining distances of target objects from the camera, outputting depth images as well as gray images for the various image frames. An example of a suitable camera may be the DImager, available from Panasonic of Japan. DImager is configured to calculate the distance to a target object by measuring the "Time-of-Flight" of near-emitted infrared rays. DImager's horizontal field-of-view is about 60 degrees and its vertical field-of-view is about 44 degrees. The resolution is about 160×120 pixels. The operating range is from 1.2-9.0 meters. It outputs range (depth) image and infrared gray image simultaneously. The process speed can reach 30 fps. Other depth cameras with the ability to generate depth and gray images may also be employed to practice the present disclosure instead.

The gestures supported may be application dependent. In various embodiments, the gestures supported may include an open hand gesture, a closed hand fist gesture, a thumb up gesture, a thumb down gesture, a thumb left gesture or a thumb right gesture, based on the extracted features.

Figure 2:
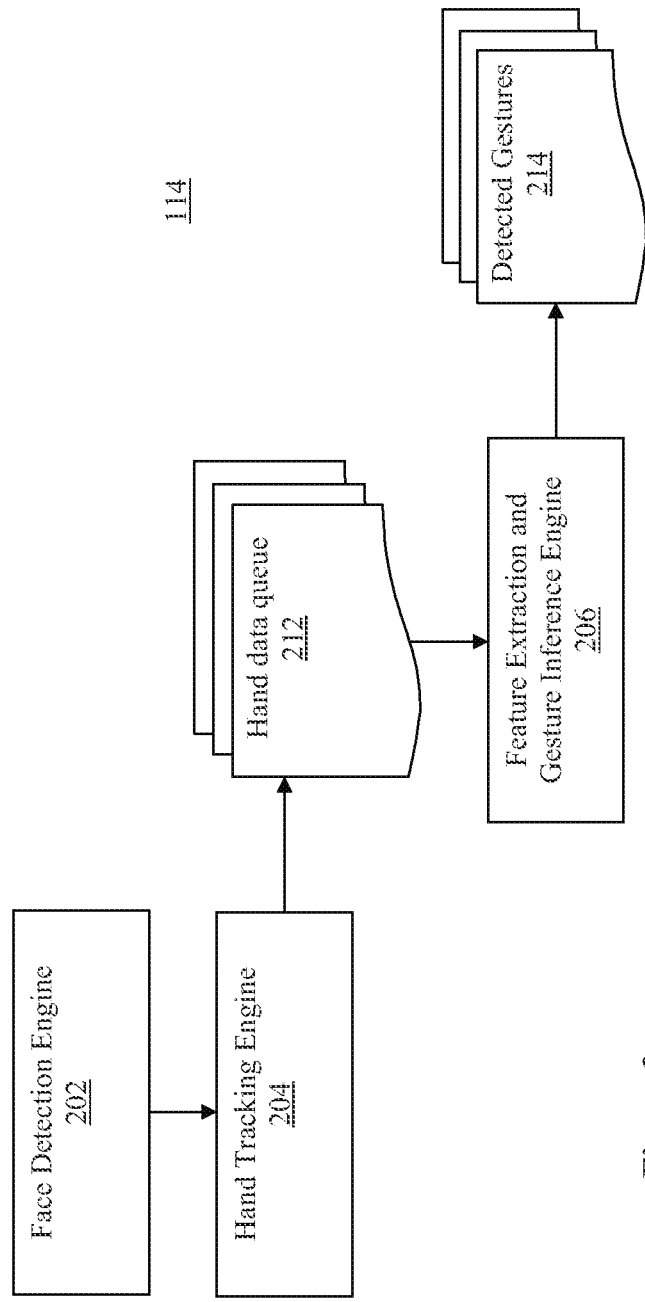
FIG. 2 illustrates the gesture based input service of FIG. 1 in further detail, in accordance with various embodiments of the present disclosure.

FIG. 2 illustrates the gesture based input service of FIG. 1 in further detail, in accordance with various embodiments of the present disclosure. As shown, for the embodiments, GBIS 114 may include face detection engine 202, hand tracking engine 204, feature extraction and gesture inference engine 206, and hand data queue 212, operatively coupled to each other. Face detection engine 202 may be configured to determine whether a face is present in the image frames, using the gray images of the image frames generated by camera 106. Hand tracking engine 204 may be configured to track a hand using the depth images of the image frames, and output results of hand tracking data to hand data queue 212. Feature extraction and gesture inference engine 206 may be configured to process the hand tracking data, extract features from the hand tracking data, and infer the hand gestures based at least in part on the extracted features.

In various embodiments, face detection engine 202 may be configured to determine whether a face is present in the image frames, using the gray images and various face detection techniques, e.g., a Haar-Cascade model. Further, for the embodiments, face detection engine 202 may be configured to determine a measure of a distance between the face and the camera, using the one or more depth images. In alternate embodiments, hand tracking engine 204 may be configured to determine the measure of distance between the face and the camera, using the one or more depth images, instead.

In various embodiments, hand tracking engine 204 may be configured to perform hand detection and tracking, only after face detection engine 202 has determined a face is present in the gray images of the image frames. In various embodiments, hand tracking engine 204 may be configured to perform hand detection while hand data queue 212 is empty, or every N frame. N may be equal to, e.g., 10. On detection of a hand, hand tracking engine 204 may track the hand and output hand tracking data into hand data queue 212, until the hand stops appearing for a predetermined number of image frames. Hand tracking data may include location measures, such as, position, size, and depth of a hand, described more fully below. The conditional configuration of detection and tracking may reduce the consumption of computation resources.

Further, in various embodiments, hand tracking engine 204 may be configured to select respective regions of the depth images that are size-wise smaller than the one or more depth images, to track a hand, based at least in part on the determined distance between the face and the camera. More specifically, hand tracking engine 204 may be configured to select respective regions of the depth images that represent an area capturing a part of the person (the hand) that is closer to the camera, than the body of the person. Generally, it can be expected a user typically makes hand gestures with the user's hands in front of the user's body, i.e., a distance or depth closer to the camera than the determined distance of the face.

In various embodiments, hand tracking engine 204 may be further configured to determine the location measures of the hand, within the tracking regions. Hand tracking engine 204 may be configured to determine position location measures in terms of a pair of (x, y) coordinates for a center of the hand for respective ones of the one or more depth images, using mean-shift filtering that uses gradients of probabilistic density.

More specifically, hand tracking engine 204 may be configured to determine the (x, y) coordinates of the center using the equations:

$$x' = \frac{\sum_{(x,y) \in ROI} p(x, y)x}{\sum_{(x,y) \in ROI} p(x, y)} \quad (1)$$

$$y' = \frac{\sum_{(x,y) \in ROI} p(x, y)y}{\sum_{(x,y) \in ROI} p(x, y)} \quad (2)$$

where p(x, y) are probabilistic density in common, here in particular, the depth information; ROI means region of interest; and x' and y' are the estimated (x, y) coordinates of the center of the hand. As described earlier, hand tracking engine 204 may be configured to further determine a size measure for the hand.

In various embodiments, hand tracking engine 204 may be further configured to perform a verification to confirm whether the hand region is valid using depth, shape and size information. On determination that any hand tracking result may be invalid or unreliable, the hand tracking result or results may be deleted from the hand data queue 212.

In various embodiments, feature extraction and gesture inferring engine 206 may be configured to extract from the hand tracking data, for the various depth images, one or more of an eccentricity measure, a compactness measure, an orientation measure, a rectangularity measure, a horizontal center measure, a vertical center measure, a minimum bounding box angle measure, a minimum bounding box width-to-height ratio measure, a difference between left-and-right measure, or a difference between up-and-down measure. Further, feature extraction and gesture inferring engine 206 may be configured to infer one of an open hand gesture, a closed hand fist gesture, a thumb up gesture, a thumb down gesture, a thumb left gesture or a thumb right gesture, 214, based on the extracted features. Additionally, feature extraction and gesture inference engine 206 may be further configured to notify an application, e.g., application 112, of the inferred hand gestures, via e.g., system services 116.

In various embodiments, the inference logic may be implemented using a classifier with multi-layer perception (MLP). The MLP classifier uses linear computation operation to improve computation efficiency. Further, the classifier may be trained using known samples. In various embodiments, to smooth the inference results, a time sliding-window containing several frames elapsed before current timestamp may be employed to vote on the inference results, and the inference result with the most votes may be outputted.

Figure 3:
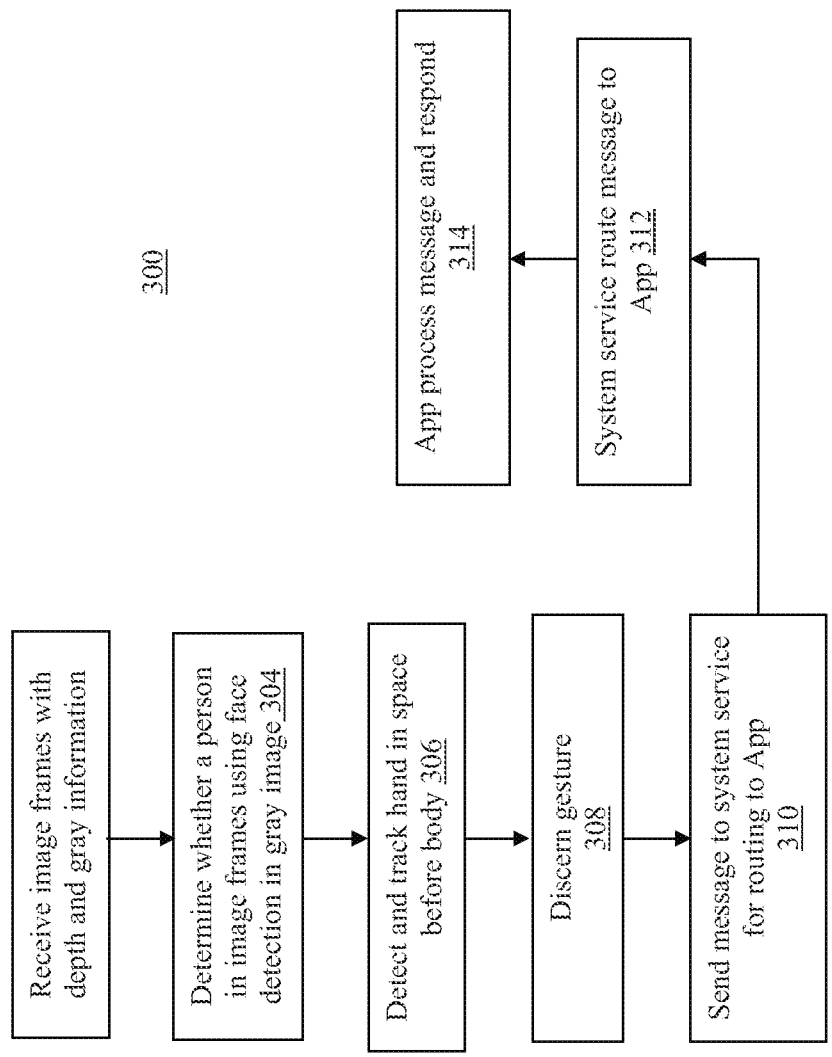
FIG. 3 illustrates a gesture recognition method, in accordance with various embodiments of the present disclosure.

FIG. 3 illustrates a gesture recognition method, in accordance with various embodiments of the present disclosure. As shown, for the embodiments, method 300 may begin at block 302, where image frames with depth information may be received. From block 302, the method may proceed to block 304, where a determination is made on whether a person, in particular, a face is present in the image frames, using e.g., face detection techniques, and the gray images.

From block 304, the method may proceed to block 306, where a hand of the person may be detected and tracked, using the depth images. From block 306, the method may proceed to block 308, where hand gestures may be inferred, based at least in part on the hand tracking data. From block 308, the method may proceed to block 310, where messages may be sent to a system service for routing to an application with interest, informing the application of the inferred hand gestures.

From block 310, the method may proceed to block 312, where the system service may route the messages to the application with interest, informing the application of the inferred hand gestures. From block 312, the method may proceed to block 314, where the application may respond to the receipt of the inferred hand gesture as input.

Figure 4:
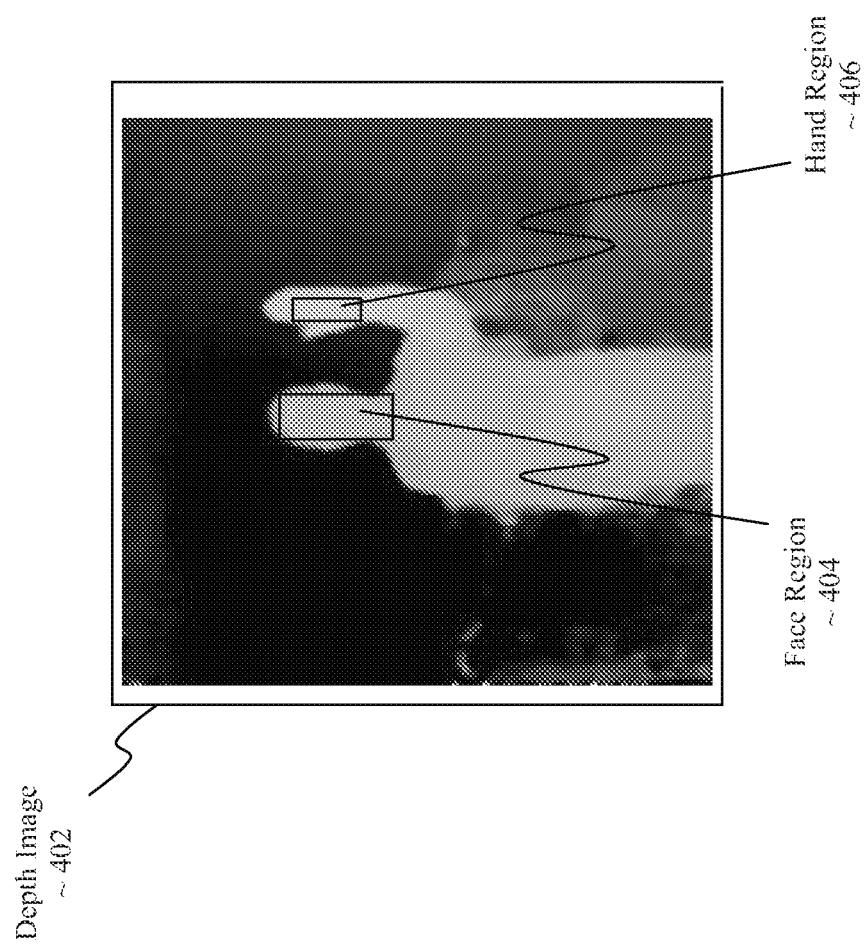
FIG. 4 illustrates an example depth image, in accordance with various embodiments of the present disclosure.

FIG. 4 illustrates an example depth image, in accordance with various embodiments of the present disclosure. The higher intensities (darker) of the grayscale represent further the distances the features are to the camera.

As shown, in various embodiments, for computational efficiency, application of face detection techniques to determine the presence of a person may be focused on the facial region 404 of depth image 402. Similarly, as described earlier, for computational efficiency, hand tracking may be focused on a size-wise smaller region where the object within the region is closer to the camera. Regions 404 and 406 are purposely kept smaller than the face and the hand respectively, for illustrative purpose only, because of the grayscale of the illustration. Regions 404 and 406, in practice, are typically larger than the illustrated regions, encompassing the face and the hand respectively, although the practice disclosure may be practiced with smaller regions as illustrated.

Figure 5:
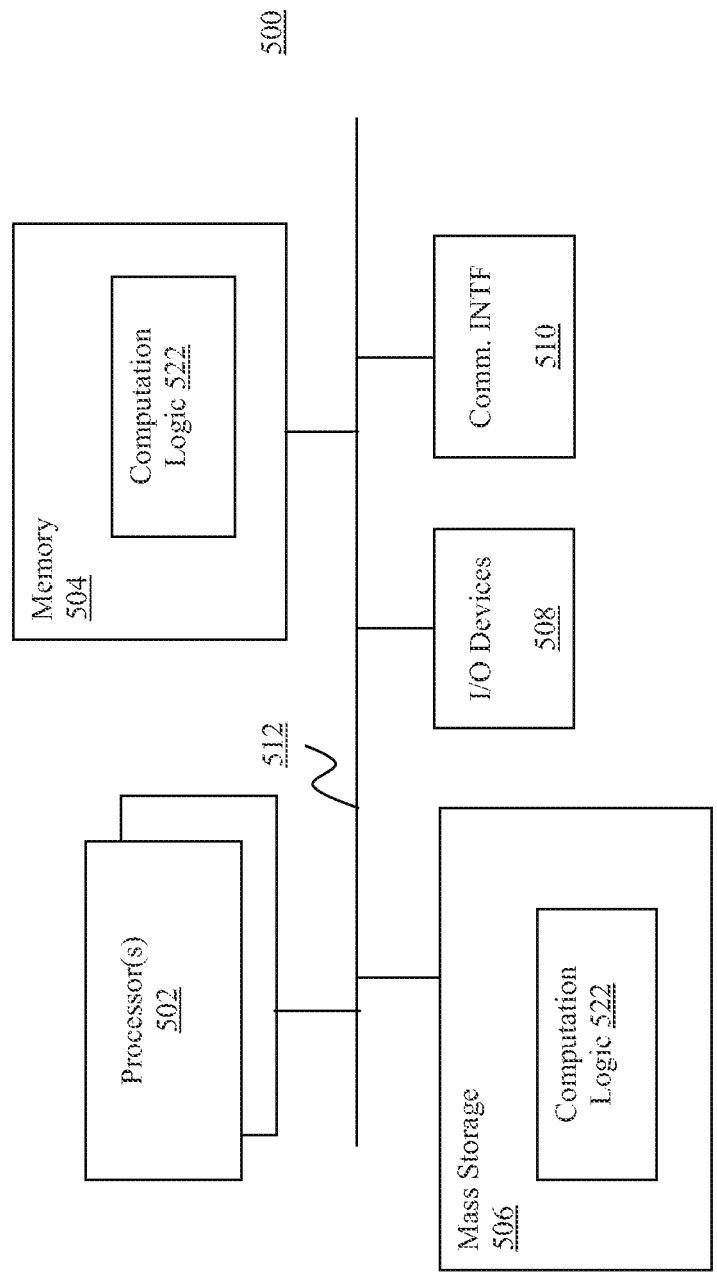
FIG. 5 illustrates an example computer system suitable for use to practice the computing apparatus of FIG. 1, in accordance with embodiments of the present disclosure.

FIG. 5 illustrates an example computer system suitable for use to practice the computing apparatus of FIG. 1, in accordance with various embodiments of the present disclosure. As shown, computing system 500 may include a number of processors or processor cores 502, and system memory 504. For the purpose of this application, including the claims, the terms "processor" and "processor cores" may be considered synonymous, unless the context clearly requires otherwise. Additionally, computing system 500 may include mass storage devices 506 (such as diskette, hard drive, compact disc read only memory (CDROM) and so forth), input/output devices 508 (such as display, keyboard, cursor control and so forth), and communication interfaces 510 (such as network interface cards, modems and so forth). The elements may be coupled to each other via system bus 512, which represents one or more buses. In the case of multiple buses, they may be bridged by one or more bus bridges (not shown).

Each of these elements performs its conventional functions known in the art. In particular, system memory 504 and mass storage 506 may be employed to store a working copy and a permanent copy of the programming instructions implementing the GBIS 114 and related functions, herein collectively denoted as computing logic 522. The various components, modules, or routines of the functions may be implemented by assembler instructions supported by processor(s) 502 or high-level languages, such as, for example, C, that can be compiled into such instructions.

The permanent copy of the programming instructions may be placed into permanent storage 506 in the factory, or in the field, through, for example, a distribution medium (not shown), such as a compact disc (CD), or through communication interface 510 (from a distribution server (not shown)). That is, one or more distribution media having an implementation of the agent program may be employed to distribute the agent, and program various computing devices.

The constitution of these elements 502-512 are known, and accordingly will not be further described.

Figure 6:
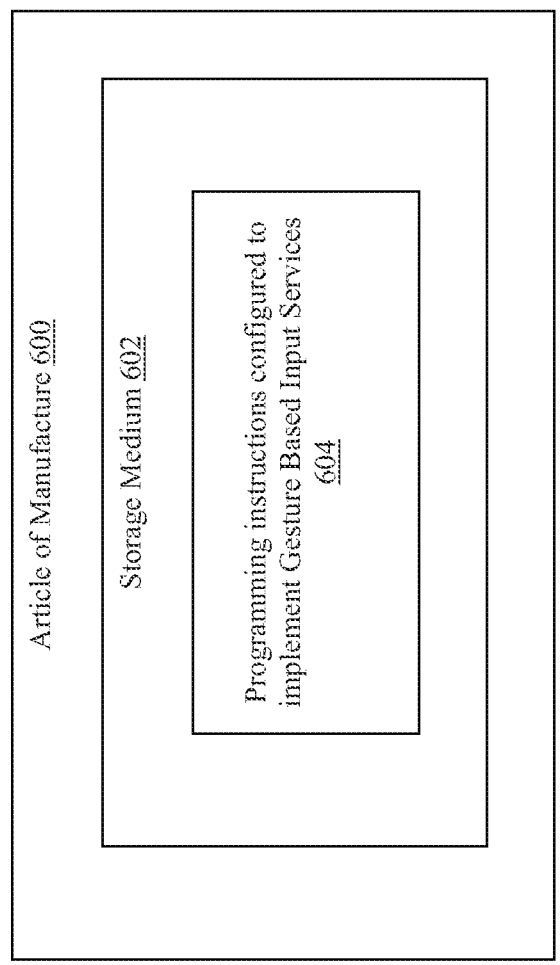
FIG. 6 illustrates an article of manufacture having programming instructions configured to cause an apparatus to practice some or all aspects of the method of FIG. 3, in accordance with embodiments of the present disclosure.

FIG. 6 illustrates an article of manufacture with programming instructions configured to enable an apparatus to practice the face recognition based control method and apparatus, in accordance with embodiments of the present disclosure. As shown, article of manufacture 600 may include computer-readable non-transitory storage medium 602. Storage medium 602 may include programming instructions 604 configured to implement the GBIS 114 of FIG. 1.

Storage medium 602 represents a broad range of persistent storage medium known in the art, including but not limited to flash memory, optical disks or magnetic disks. Programming instructions 604, in particular, may enable an apparatus, in response to their execution by the apparatus, to perform operations including:
- tracking, by a computing apparatus, a hand in selected respective regions of one or more depth images generated by a depth camera, wherein the selected respective regions are size-wise smaller than the respective one or more depth images; and
- inferring a hand gesture, by computing device, based at least in part on a result of the tracking.

In alternate embodiments, programming instructions 604, in particular, may enable an apparatus, in response to their execution by the apparatus, to perform operations including:
- extracting, by a computing apparatus, one or more features from respective regions of depth images of image frames generated by a depth camera; and
- inferring a gesture, by the computing apparatus, based at least in part on the one or more features extracted from the depth images.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. An apparatus, comprising:
a face detection engine configured to determine whether a face is present in one or more gray images of respective image frames generated by a depth camera;
a hand tracking engine coupled to the face detection engine, and configured to track a hand in one or more depth images generated by the depth camera, on determination by the face detection engine that a face is present in the one or more gray images; and
a feature extraction and gesture inference engine coupled to the hand tracking engine, and configured to extract features based on results of the tracking by the hand tracking engine, and infer a hand gesture based at least in part on the extract features;
wherein either the face detection engine or the hand tracking engine is further configured to determine a measure of a distance between the face and the camera, using the one or more depth images.

2. The apparatus of claim 1, wherein the face detection engine is configured to analyze the gray images using a Haar-Cascade model, to determine whether a face is present in the one or more gray images.

3. A method comprising:
determining by a computing apparatus, whether a face is present in one or more gray images of respective image frames generated by a depth camera;
tracking, by the computing apparatus, a hand in selected respective regions of one or more depth images generated by the depth camera, on determination that a face is present in the one or more gray images, wherein the selected respective regions are size-wise smaller than the respective one or more depth images; and
inferring a hand gesture, by the computing device, based at least in part on a result of the tracking;
wherein tracking comprises determining location measures of the hand for the depth images.

4. The apparatus of claim 1, wherein the hand tracking engine is further configured to select respective regions of the depth images that are size-wise smaller than the one or more depth images, to track the hand, based at least in part on the determined distance between the face and the camera.

5. The apparatus of claim 4, wherein the hand tracking engine is further configured to determine location measures of the hand.

6. The apparatus of claim 5, wherein the hand tracking engine is configured to determine the location measures in terms of a pair of (x, y) coordinates for a center of the hand for respective ones of the one or more depth images, using mean-shift filtering that uses gradients of probabilistic density.

7. The apparatus of claim 1, wherein the feature extraction and gesture inferring engine is configured to extract one or more of an eccentricity measure, a compactness measure, an orientation measure, a rectangularity measure, a horizontal center measure, a vertical center measure, a minimum bounding box angle measure, a minimum bounding box width-to-height ratio measure, a difference between left-and-right measure or a difference between up-and-down measure.

8. The apparatus of claim 1, wherein the feature extraction and gesture inferring engine is configured to infer one of an open hand gesture, a closed hand fist gesture, a thumb up gesture, a thumb down gesture, a thumb left gesture or a thumb right gesture, based on the extracted features.

9. The apparatus of claim 1, wherein the feature extraction and gesture inference engine is further configured to notify an application of the inferred hand gesture.

10. The apparatus of claim 1, further comprising the camera.

11. The apparatus of claim 1, where the apparatus is a selected one of a desktop computer, a laptop computer, a tablet computer, a server, a smart phone, a personal digital assistant, a game console, or a set-top box.

12. The method of claim 3, wherein determining location measures of the hand for the depth images comprises determining a pair of (x, y) coordinates for a center of the hand, using mean-shift filtering that uses gradients of probabilistic density.

13. The method of claim 3, wherein inferring comprises extracting one or more features for the selected respective regions, based at least in part on a result of the tracking, and inferring a hand gesture based at least in part on the extracted one or more features.

14. The method of claim 13, wherein extracting one or more features comprises extracting one or more of an eccentricity measure, a compactness measure, an orientation measure, a rectangularity measure, a horizontal center measure, a vertical center measure, a minimum bounding box angle measure, a minimum bounding box width-to-height ratio measure, a difference between left-and-right measure, or a difference between up-and-down measure.

15. The method of claim 3, wherein inferring a gesture comprises inferring one of an open gesture, a fist gesture, a thumb up gesture, a thumb down gesture, a thumb left gesture or a thumb right gesture.

16. A method comprising:
determining by a computing apparatus, whether a face is present in one or more gray images of respective image frames generated by a depth camera;

tracking, by the computing apparatus, a hand in selected respective regions of one or more depth images generated by the depth camera, on determination that a face is present in the one or more gray images, wherein the selected respective regions are size-wise smaller than the respective one or more depth images;

extracting, by the computing apparatus, one or more features from respective regions of the depth images; and inferring a hand gesture, by the computing apparatus, based at least in part on the one or more features extracted from the depth images;

wherein extracting one or more features comprises extracting one or more of an eccentricity measure, a compactness measure, an orientation measure, a rectangularity measure, a horizontal center measure, a vertical center measure, a minimum bounding box angle measure, a minimum bounding box width-to-height ratio measure, a difference between left-and-right measure, or a difference between up-and-down measure.

17. The method of claim 16, wherein extracting one or more features from respective regions of depth images comprises extracting one or more features from respective regions of depth images denoted as containing a hand.

18. The method of claim 16 wherein inferring a gesture comprises inferring one of an open gesture, a fist gesture, a thumb up gesture, a thumb down gesture, a thumb left gesture or a thumb right gesture.

19. A computer-readable non-transitory storage medium, comprising:

a plurality of programming instructions stored in the storage medium, and configured to cause an apparatus, in response to execution of the programming instructions by the apparatus, to perform operations including:

determining whether a face is present in one or more gray images of respective image frames generated by a depth camera;

tracking a hand in selected respective regions of one or more depth images generated by the depth camera, on determination that a face is present in the one or more gray images, wherein the selected respective regions are size-wise smaller than the respective one or more depth images; and inferring a hand gesture, based at least in part on a result of the tracking;

wherein tracking comprises determining location measures of the hand for the depth images.

20. The storage medium of claim 19, wherein determining location measures of the hand for the depth images comprises determining a pair of (x, y) coordinates for a center of the hand, using mean-shift filtering that uses gradients of probabilistic density.

21. The storage medium of claim 19, wherein inferring comprises extracting one or more features for the selected respective regions, based at least in part on a result of the tracking, and inferring a hand gesture based at least in part on the extracted one or more features.

22. The storage medium of claim 21, wherein extracting one or more features comprises extracting one or more of an eccentricity measure, a compactness measure, an orientation measure, a rectangularity measure, a horizontal center measure, a vertical center measure, a minimum bounding box angle measure, a minimum bounding box width-to-height ratio measure, a difference between left-and-right measure, or a difference between up-and-down measure.

23. The storage medium of claim 19, wherein inferring a gesture comprises inferring one of an open gesture, a fist gesture, a thumb up gesture, a thumb down gesture, a thumb left gesture or a thumb right gesture.

24. The storage medium of claim 19, wherein the operations further comprise determining whether a face is present in the one or more depth images' corresponding one or more gray images of respective image frames generated by a depth camera.

25. The storage medium of claim 24, wherein determining whether a face is present comprises analyzing the one or more gray images using a Haar-Cascade model.

26. The storage medium of claim 24, wherein the operations further comprise determining a measure of a distance between the face and the camera, using the one or more depth images.

* * * * *